United States Patent
Jones

(10) Patent No.: US 11,385,636 B2
(45) Date of Patent: Jul. 12, 2022

(54) SYSTEM AND METHOD FOR TRANSPORTING INVENTORY ITEMS IN LOGISTIC FACILITIES

(71) Applicant: Kabushiki Kaisha Toshiba, Minato-ku (JP)

(72) Inventor: Simon Jones, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 378 days.

(21) Appl. No.: 16/557,544

(22) Filed: Aug. 30, 2019

(65) Prior Publication Data

US 2021/0064022 A1    Mar. 4, 2021

(51) Int. Cl.
*G05D 1/00* (2006.01)
*B65G 1/137* (2006.01)
*G05D 1/02* (2020.01)
*G06Q 50/28* (2012.01)

(52) U.S. Cl.
CPC ........... *G05D 1/0027* (2013.01); *B65G 1/137* (2013.01); *G05D 1/0022* (2013.01); *G05D 1/0291* (2013.01); *G05D 2201/0216* (2013.01); *G06Q 50/28* (2013.01)

(58) Field of Classification Search
CPC ............................................. G05D 2201/0216
See application file for complete search history.

(56) References Cited

U.S. PATENT DOCUMENTS

| | | | |
|---|---|---|---|
| 6,895,301 B2 | 5/2005 | Mountz | |
| 7,343,222 B2 | 3/2008 | Solomon | |
| 7,873,469 B2* | 1/2011 | D'Andrea | G01C 21/005 701/410 |
| 9,008,830 B2* | 4/2015 | Worsley | G05D 1/0291 700/217 |
| 9,733,638 B2* | 8/2017 | Ziegler | B65G 1/137 |
| 9,792,577 B2* | 10/2017 | Mountz | G06Q 10/087 |
| 2010/0286824 A1 | 11/2010 | Solomon | |
| 2017/0308084 A1* | 10/2017 | Spicer | B62B 5/0083 |
| 2018/0194556 A1 | 7/2018 | Lert, Jr. et al. | |
| 2019/0243354 A1* | 8/2019 | Beutler | G06Q 50/30 |
| 2020/0081455 A1* | 3/2020 | Li | G05D 1/0289 |

FOREIGN PATENT DOCUMENTS

CN        104199428 A    12/2014

* cited by examiner

*Primary Examiner* — Truc M Do
(74) *Attorney, Agent, or Firm* — Oblon, McClelland, Maier & Neustadt, L.L.P.

(57) ABSTRACT

A method for transporting items in a system including plural structures of different designs, plural robots connected in a wireless network for transporting the plural structures, and a control system connected in the wireless network. The method includes: receiving, by the control system, a transport request indicating a structure to be transported from a current location to a new location and determining, by the control system, based on the transport request, a number of robots to assign to the transport request. The method further includes: coordinating, by the control system, a lift operation by the number of robots of the structure, wherein during the lift operation each robot engages with a lifting location associated with the structure, and coordinating, by the control system, transport, by the number of robots, of the structure to the new location.

23 Claims, 12 Drawing Sheets

SYSTEM AND METHOD FOR TRANSPORTING INVENTORY ITEMS IN LOGISTIC FACILITIES

FIELD

Embodiments described herein relate generally to a method of transporting items, such as inventory items in logistic facilities.

BACKGROUND

Robots are widely used within materials handling systems or warehouses for inventory movement. Inventory, consisting of multiple different types (stock control units, stock keeping unit (SKUs)) in multiple quantities is stored on moveable inventory structures or trays or pallets or pods or totes which are located within a storage area. In order that inventory can be deposited in and retrieved from this storage area, a controlling system informs robots within the storage area of such requests, and they act to move inventory structures with available space to the deposit location or inventory structures containing the requested SKU to the retrieval location.

Current approaches use a) identically sized inventory structures and identical robots, or b) differently sized structures and differently sized robots, or c) differently sized structures and identically sized robots capable of moving all sized structures. In case a) the structures have to be sized for the largest SKU, resulting in wasted space. In case b) having different robots means greater maintenance overhead and smaller economies of scale. In case c) the robots have to be sized such as to move the largest structure size. All of these factors result in increased cost.

Arrangements of the present invention will be understood and appreciated more fully from the following detailed description, made by way of example only and taken in conjunction with drawings in which.

DETAILED DESCRIPTION

Figure 1:
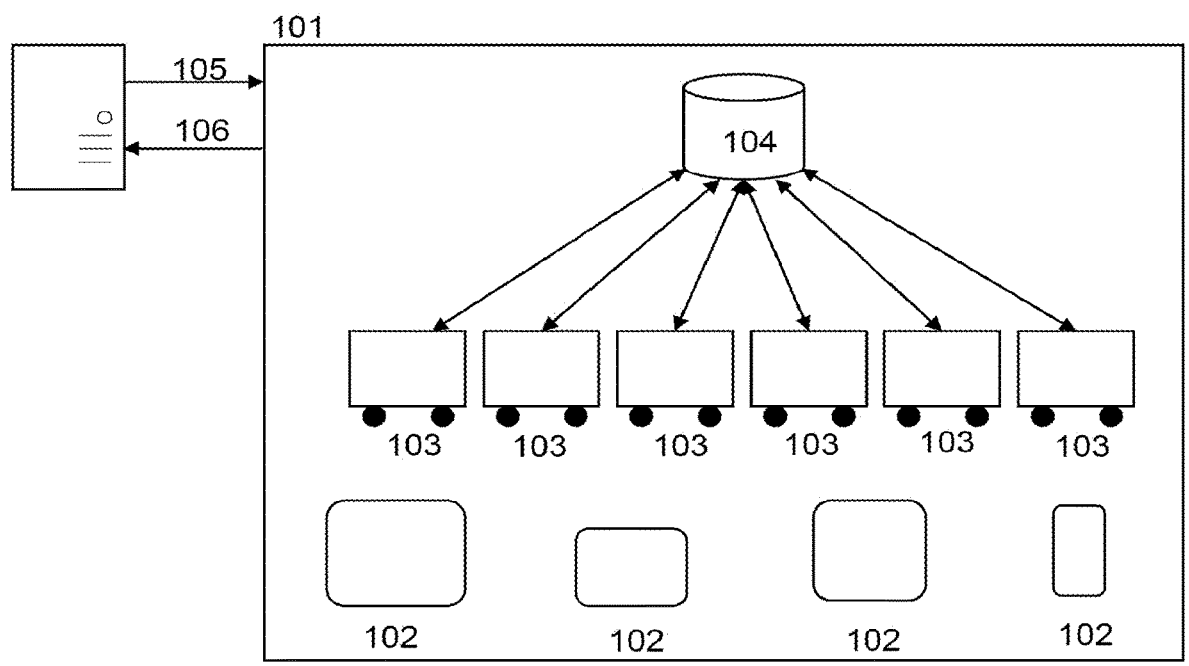
FIG. 1 shows a system for transporting items according to an embodiment.

According to a first aspect of the invention there is provided a method for transporting items in a system, wherein the system comprises a plurality of structures of different designs, a plurality of robots connected in a wireless network for transporting the plurality of structures, and a control system connected in the wireless network. The method comprises receiving, by the control system, a transport request indicating a structure to be transported from a current location to a new location, determining, by the control system, based on the transport request, a number of robots to assign to the transport request, coordinating, by the control system, a lift operation by the number of robots of the structure, wherein during the lift operation each robot engages with a lifting location associated with the structure; and coordinating, by the control system, transport, by the number of robots, of the structure to the new location.

In an embodiment, the control system is within a single control robot, the control robot within the plurality of robots. In a further embodiment, the control system is a distributed system comprising a plurality of control agents, a control agent within each robot of the plurality of robots.

In an embodiment, the method further comprises determining, by the control system, a number of lifting locations associated with the structure and assigning by the control system the lifting location to each robot of the number of robots.

In a further embodiment, the transport request allows a design of the structure to be determined, wherein the number of lifting locations is determined based on the design of the structure, wherein the number of robots is determined based on the number of lifting locations.

In an embodiment, the structure is configured so that the robot may occupy the lifting location from beneath the structure and wherein each robot comprises a lifting platform, the lifting platform configured to engage with the lifting location during the lift operation.

In an embodiment, the method further comprises determining, by the control system, if there are sufficient available robots for the number of robots, and waiting until there are sufficient available robots before assigning, by the control system, the number of robots to the transport request.

Optionally, the transport request may allow a load of the structure to be determined and the number of robots is determined based on the structure design and on the load of the structure.

In an embodiment, each robot comprises a mechanism for determining a load of the structure experienced by that robot. The method then further comprises during the lift operation, determining by each robot the load of the structure experienced by that robot, if the load experienced by that robot exceeds a load limit, sending, by the robot, to the control system an overload message, on receiving, by the control system, an overload message: instructing, by the control system, the number of robots to abort the lift operation and perform a lower operation, wherein during the lower operation each robot disengages with the assigned lifting location; assigning, by the control system, an additional robot to the number of robots; instructing, by the control system, the additional robot to move to the current location; and assigning, by the control system, the additional robot to a lifting location associated with the structure.

In a further embodiment, wherein each robot comprises a mechanism for determining a load of the structure experienced by that robot, the method further comprises during the lift operation, determining by each robot the load of the structure experienced by that robot, if the load experienced by that robot exceeds a balanced load limit, sending, by the robot, to the control system an unbalanced message, on receiving, by the control system, the unbalanced message: instructing, by the control system, the number of robots to abort the lift operation; and assigning, by the control system, each robot of the number of robots to a new lifting location associated with the structure.

In an embodiment, the transport request comprises an identification number, indicating a priority of the transport request, and the method further comprises assigning, by the control system, the number of robots to the transport request based on the identification number.

According to a second aspect of the invention there is provided a system for transporting items comprising a plurality of structures of different designs for holding items for transport, a plurality of robots connected in a wireless network for transporting the plurality of structures, and a control system connected in the wireless network, the system configured to perform the method described above.

According to a third aspect of the invention there is provided a non-transitory computer-readable storage medium storing instructions executable by a computer processor and causing the processor to perform, when executing the instructions, the method steps described above.

According to a fourth aspect of the invention there is provided a robot for transporting items in a system, the system comprising a plurality of structures of different designs for holding the items for transport, a plurality of robots connected in a wireless network for transporting the plurality of structures, and a control system connected in the wireless network, the robot configured to based on instructions from the control system, move to a current location, based on instructions from the control system, occupy an assigned lifting location associated with the structure, based on instructions from the control system, engage with the assigned lifting location to perform a lift operation, based on instructions from the control system, transport with the number of robots, the structure to a new location.

In one embodiment, the control system is external to the robots. In another embodiment, the controls system is within a single control robot, the control robot within the plurality of robots. In a further embodiment, the control system is a distributed system comprising a plurality of control agents, a control agent within each robot of the plurality of robots.

In a further embodiment, the robot comprises a lifting platform and the robot is further configured to occupy the lifting location from beneath the structure, and use the lifting platform to engage with the lifting location during the lift operation.

In a further embodiment, the robot comprises a mechanism for determining a load of the structure experienced by that robot, the robot further configured to: during the lift operation, determine by the robot the load of the structure experienced by the robot; and if the load experienced by the robot exceeds a load limit, generate an overload message for use by the control system.

In one embodiment, the control system is external to the robots. In another embodiment, the controls system is within a single control robot, the control robot within the plurality of robots. In a further embodiment, the control system is a distributed system comprising a plurality of control agents, a control agent within each robot of the plurality of robots.

In a further embodiment the robot comprises a mechanism for determining a load of the structure experienced by that robot and the robot is further configured to during the lift operation, determine by the robot the load of the structure experienced by the robot, and if the load experienced by the robot exceeds a balanced load limit, generate an unbalanced message for use by the control system.

In one embodiment, the control system is external to the robots. In another embodiment, the controls system is within a single control robot, the control robot within the plurality of robots. In a further embodiment, the control system is a distributed system comprising a plurality of control agents, a control agent within each robot of the plurality of robots.

According to a fifth aspect of the invention, there is provided a robot for transporting items in a system, the system comprising a plurality of structures of different designs for holding the items for transport, a plurality of robots connected in a wireless network for transporting the plurality of structures, and a control system connected in the wireless network, wherein the control system is a distributed system comprising a plurality of control agents, a control agent within each robot, the robot configured to receive a transport request indicating a structure to be transported from a current location to a new location, determine if the robot is the closest robot of the plurality of robots to the structure, if the robot is the closest robot to the structure determine, based on the transport request, a number of robots to assign to the transport request, coordinate a lift operation by the number of robots of the structure, wherein during the lift operation each robot engages with a lifting location associated with the structure, and coordinating transport, by the number of robots, of the structure to the new location.

In an embodiment, the robot is further configured to determine a number of lifting locations associated with the structure, and assign the lifting location to each robot of the number of robots.

In a further embodiment, the robot comprises a lifting platform, and the robot is further configured to occupy the lifting location from beneath the structure, and use the lifting platform to engage with the lifting location during the lift operation.

In a further embodiment, the transport request allows a design of the structure to be determined, wherein the number of lifting locations is determined based on the design of the structure and wherein the number of robots is determined based on the number of lifting locations.

In an embodiment the robot is further configured to, if the robot is the closet robot to the structure, determine if there are sufficient available robots for the number of robots, and wait until there are sufficient number of robots available before assigning the number of robots to the transport request.

In a further embodiment, the transport request allows a load of the structure to be determined, and the number of robots is determined based on the structure design and on the load of the structure.

In an embodiment, each robot comprises a mechanism for determining a load of the structure experienced by that robot, and the robot is further configured to receive an overload message from another robot when the load experienced by the other robot exceeds a load limit, wherein if the robot is the closest robot to the structure, the robot further configured to instruct the number of robots to abort the lift operation and perform a lower operation, wherein during the lower operation each robot disengages with the assigned lifting location, assign an additional robot to the number of robots, instruct the additional robot to move to the current location, and assign the additional robot to a lifting location associated with the structure.

In a further embodiment, each robot comprises a mechanism for determining a load of the structure experienced by that robot, and the robot is further configured to receive an unbalanced message from another robot, wherein the load experienced by the other robot exceeds a load limit, wherein if the robot is the closet robot to the structure, the robot further configured to instruct the number of robots to abort the lift operation and perform a lower operation, wherein during the lower operation each robot disengages with the assigned lifting location; and assign each robot of the number of robots to a new lifting location associated with the structure.

In an embodiment, wherein the transport request comprises an identification number, indicating a priority of the transport request, and the robot is further configured to assign the number of robots to the transport request based on the identification number.

In a sixth aspect of the invention, an inventory structure is provided comprising a number of lifting locations, each lifting location configured to be engaged with by the robots described above.

FIG. 1 shows a system for transporting items 101 according to an embodiment. The system may be used for transporting items, such as inventory items, in warehouses or other locations. The system comprises a plurality of structures 102 for holding the items for transport, a plurality of robots 103 for moving the structures, and a control system 104 for controlling the movement of the structures by the robots. The plurality of robots 103 and the control system 104 can be connected on a wireless network and are able to communicate.

The control system 104 receives a transport request 105 from a user, indicating a structure 102 to be transported. The control system 104 communicates with the robots 103 to facilitate the movement of the structure 102 from a current location to a new location.

Each robot 103 may have a robot ID number to facilitate communication with the control system 104. For example, the robot ID may allow instructions specific for a particular robot 103 to be identified. Hence, communications from the control system may include a robot ID number.

Once the structure 102 is in the new location, the control system 104 may send confirmation 106 that the transport request 105 has been completed to the user.

The plurality of structures 102 can be of a plurality of different sizes and shapes. The plurality of structures 102 can be trays, pallets, pods, totes or platforms on which the items for transport are placed. The structures may all have the same size and shape, all have different sizes and/or different shapes and/or be a mixture of structures comprising a plurality of structures have a first size and/or shape and a plurality of structures have a second, different size and/or shape.

FIG. 2 shows an example of the plurality of structures 102. The plurality of structures may have a different structure design. For example, in FIG. 2, the plurality of structures 102 are of a plurality of different sizes, for example a size 1 structure, a size 4 structure and a size 9 structure. In the embodiment the size indicator associated with the structures indicates a multiple of a unit footprint that defines the footprint of the structure. In an alternative embodiment the size indicator associated with the structures indicates the number of structural points at which a robot can engage the structure.

The structure design may indicate whether the structure is a tray, pallet, platform or other type. Furthermore, while the structures 102 of FIG. 2 have a square footprint as an example, different designs of the structures 102 may include different-shaped footprints, such as rectangular, circular or another shape.

Therefore, the design of the structure 102 may vary in size, weight, type of structure, shape, geometry or footprint.

The designs define lifting locations 204 with respect to the structure 102 that can be used by robots 103 for engaging with the structure 102 during a lift operation of the structure 102. Each lifting location 204 is suitable/sized for a single robot 103 to engage with. In one embodiment, each robot 103 is, during a lifting operation, assigned a lifting location 204 with which to engage during a lift operation. Alternatively, each robot 103 chooses a lifting location 204 with which to engage during a lift operation.

The number of lifting locations 204 and the position of each lifting location 204 with respect to the structure 102 depends on the structure design, such as the structure size, the structure geometry and/or the structure weight.

For example, referring to FIG. 2(*a*), a size 1 structure 201 has a single lifting location 204 associated with it. The lifting location 204 can be engaged by a single robot 103 to perform a lift. Therefore, a size 1 structure can be lifted by a single robot 103.

For example, referring to FIG. 2(*a*), a size 4 structure 202 has four lifting locations 204. Each of the four lifting locations 204 can be engaged by a single robot 103 (one for each location) to perform a lift. Therefore, a size 4 structure can be lifted by four robots simultaneously.

For example, referring to FIG. 2(*a*), a size 9 structure (102, 113) has nine lifting locations 204. Each of the nine lifting locations can be engaged by a single robot 103 (one for each location) to perform a lift. Therefore, a size 9 structure 203 can be lifted by nine robots simultaneously.

In an alternative example, referring to FIG. 2(*b*), a size 9 structure (102, 113) may have a structure that, in addition to be engageable by nine robots in nine lifting locations, can be engaged in four lifting locations 204 that are different from the nine lifting locations. Each of the four lifting locations can be engaged by a single robot 103 (one for each location) to perform a lift. Therefore, a size 9 structure 203 can be lifted by four robots simultaneously. The only condition required to allow this is that the structure (102, 113) is sufficiently strong to support lifting by four or nine robots respectively if the robots lift the structure (102, 113) in the respectively indicated lifting locations.

A lifting location 204 may be defined as a point with respect to the structure 102, as shown in FIG. 2(*a*) and FIG. 2(*b*). Alternatively, a lifting location 204 may be defined as an area with respect to the structure 102, as shown in FIG. 2(*c*). In FIG. 2(*c*), the structure is divided into a number of areas, with each area being a lifting location 204. In FIG. 2(*c*), the lifting locations 204 are of equal area, however, the lifting locations may be of different areas.

FIG. 2(*d*) shows a view of a size 9 structure 203 from above in accordance with an embodiment. Lifting locations 204 may be defined with respect to the structure, by dividing the footprint of the structure into a number of areas, with each area being a lifting location 204. In FIG. 2(*d*), the lifting locations 204 are of equal area, however, the lifting locations may be of different areas or unequal areas.

Figure 2A:
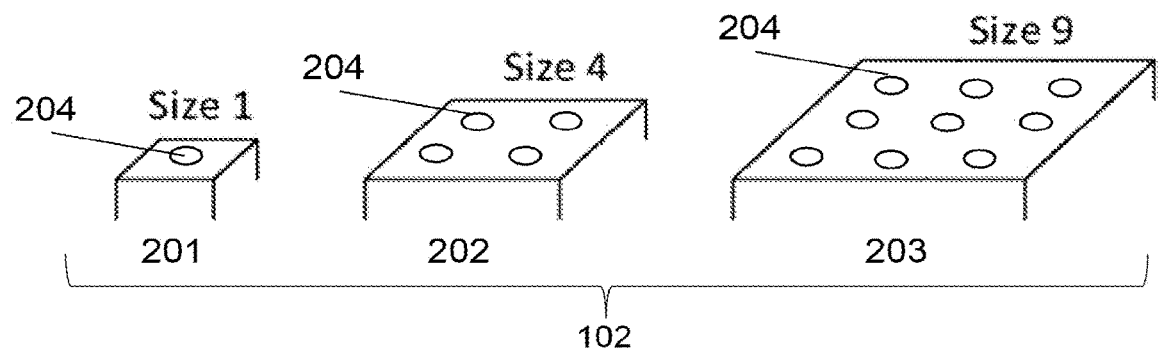
FIG. 2(a) shows an example of a plurality of structures according to an embodiment.
Figure 2B:
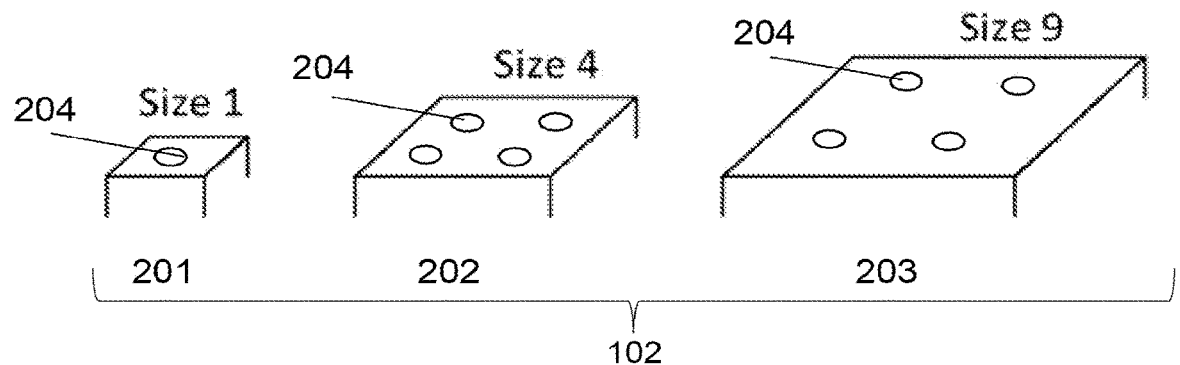
FIG. 2(b) shows an example of a plurality of structures according to an embodiment.
Figure 2C:
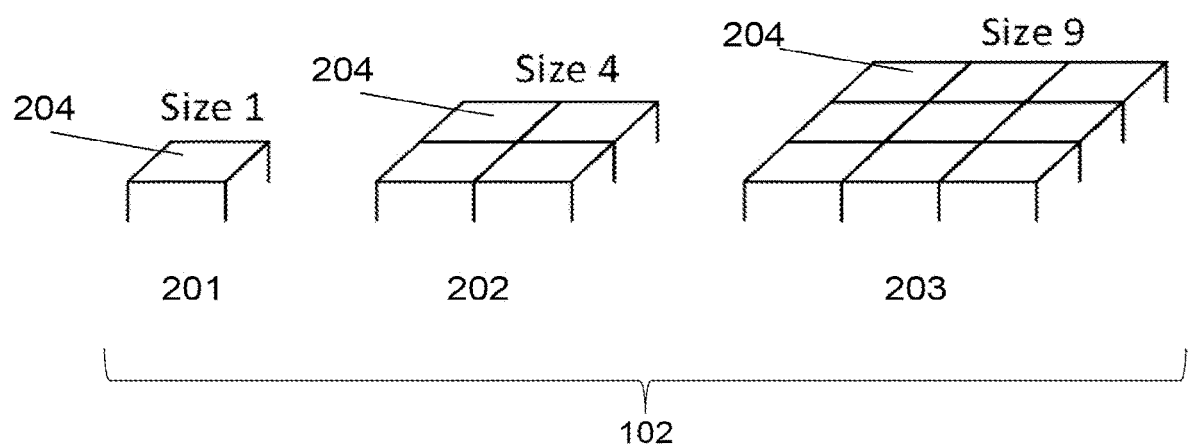
FIG. 2(c) shows an example of a plurality of structures according to an embodiment.
Figure 2D:
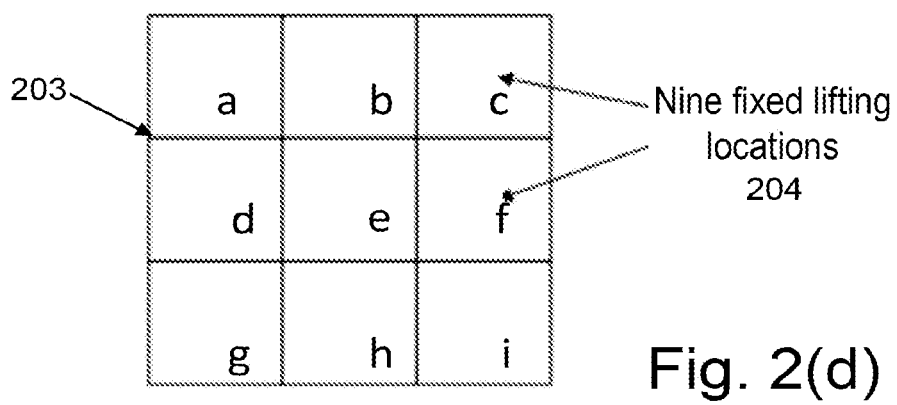
FIG. 2(d) shows a plan view of a structure according to an embodiment.
Figure 2E:
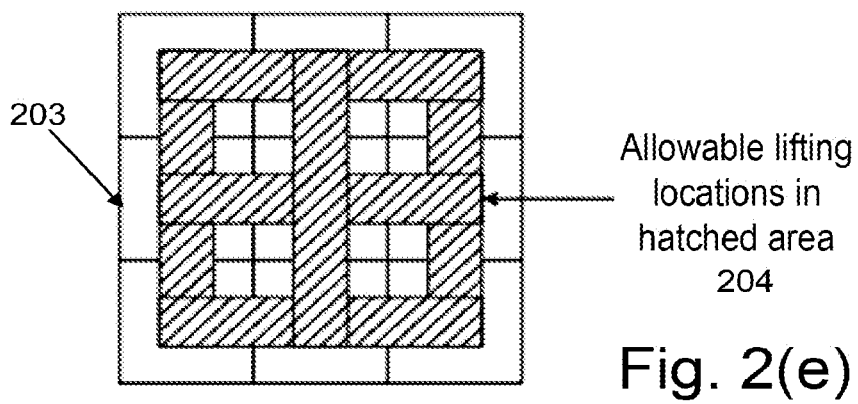
FIG. 2(e) shows a plan view of a structure according to an embodiment.

FIG. 2(e) shows an alternative view of a size 9 structure 203 from above in accordance with a further embodiment. Each hatched area defines a lifting location which is continuously suitable along its area for engaging with, by the robot, during a lift operation. A robot may be positioned in any part of the hatched area to engage with the structure 102 during a lift operation of the structure 102.

In the case of larger sized structures 102, it is also possible that fewer robots 103 than the total number of defined lifting locations 204 can be used. For example, the size 9 structure 203 of FIG. 2(a) to FIG. 2(d) could be lifted by four robots, one at each corner lifting location 204, e.g. lifting locations a, c, g and i of FIG. 2(d).

It would be clear to the person skilled in the art that other sizes and designs of structures 102 are possible, and other combinations of lifting locations 204 are possible.

The number of robots 103 required to lift a structure 102 may depend on the structure design, the balancing requirements of the structure 102, the lifting capacity of the robots (individual load capacity) and/or the weight of the load.

Each robot 103 is capable of engaging with a lifting location 204 of the structure 102 so as to perform a lift. In an embodiment, each robot comprises a lifting mechanism to engage with a lifting positon 204 of the structure 102. A further US patent application with the title "System and Method for Cooperative Robotics" filed at the same date as the present document and incorporated herein by reference in its entirety provides detail relating to a manner in which a group of robots may form and maintain a formation suitable for particular transport operations.

Figure 3A:
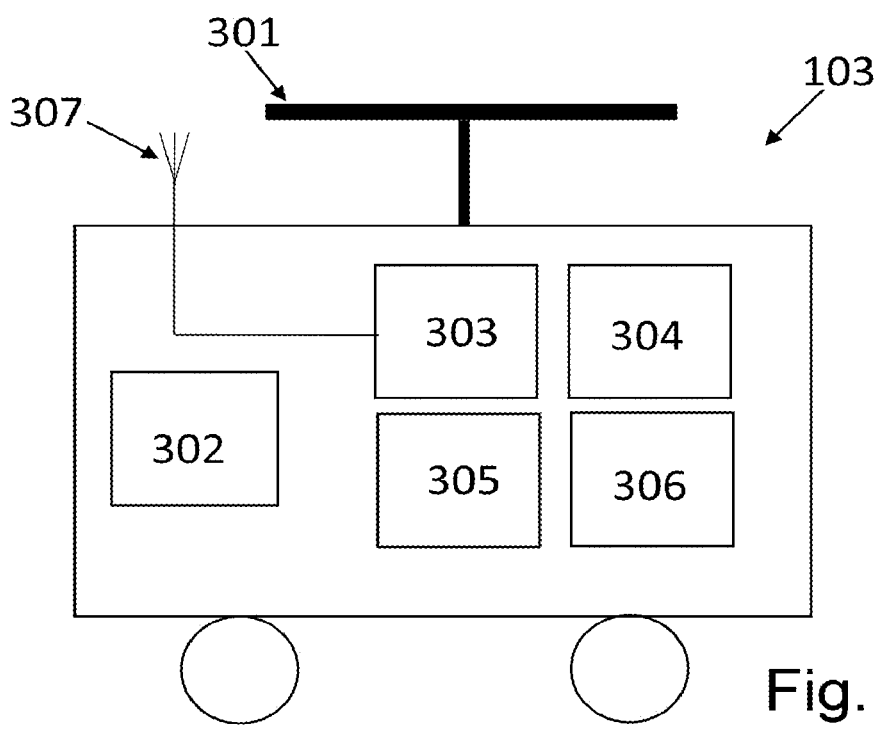
FIG. 3(a) illustrates a robot according to an embodiment.

FIG. 3(a) illustrates an embodiment, wherein each robot 103 has a holonomic drive 302 and a fixed lifting platform 301 on its top surface. The holonomic drive 302 controls the movement of the robot 103, for example, as it move to the current location of the structure 102. The lifting platform 301 is configured to engage with the lifting location 204 of the structure 102 during a lift operation.

Each robot 103 further comprises a wireless input/output port 303 connected to an antenna 307 to transmit and receive signals. The robot 103 may receive a signal from the control system 104, such as a signal specifying a lifting position 204. The robot 103 may transmit a signal to the control system 104, such as a signal indicating that a load experienced by the robot during a lift operation is too big. In other embodiments, the robot 102 may receive or transmit signals to and from other robots 103.

Each robot further comprises a microprocessor 304 and a non-volatile memory 305. The microprocessor 304 is configured to execute instructions received from the control system 104, or another robot. The microprocessor is also configured to execute instructions stored in the non-volatile memory 305. Execution of these instructions causes the robot 103 to perform some of the method steps described herein. For example, execution of the instructions may cause a control module 306 in conjunction with the holonomic drive 302 to move the robot 103 to the current location of the structure 102.

Figure 3B:
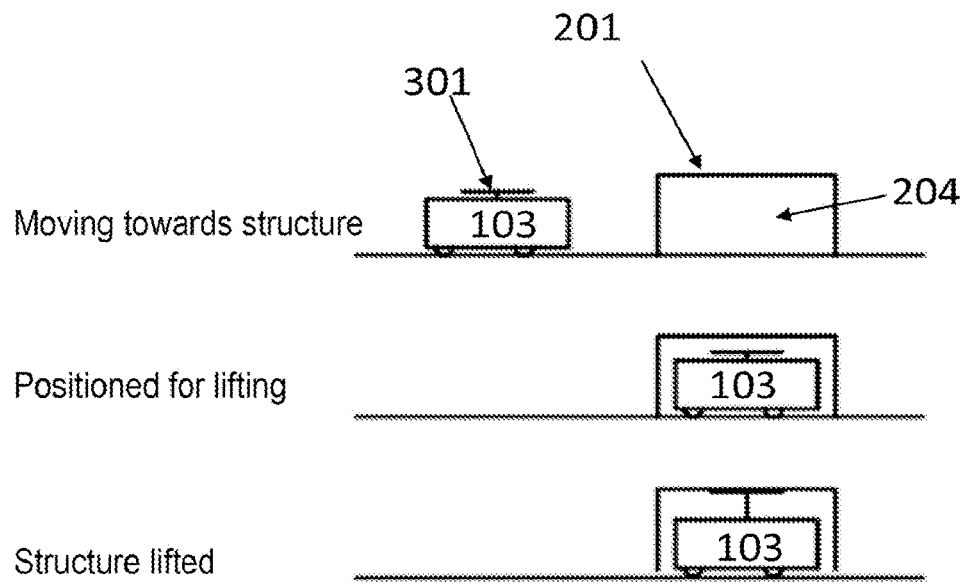
FIG. 3(b) illustrates robots and a structure according to an embodiment.
Figure 3C:
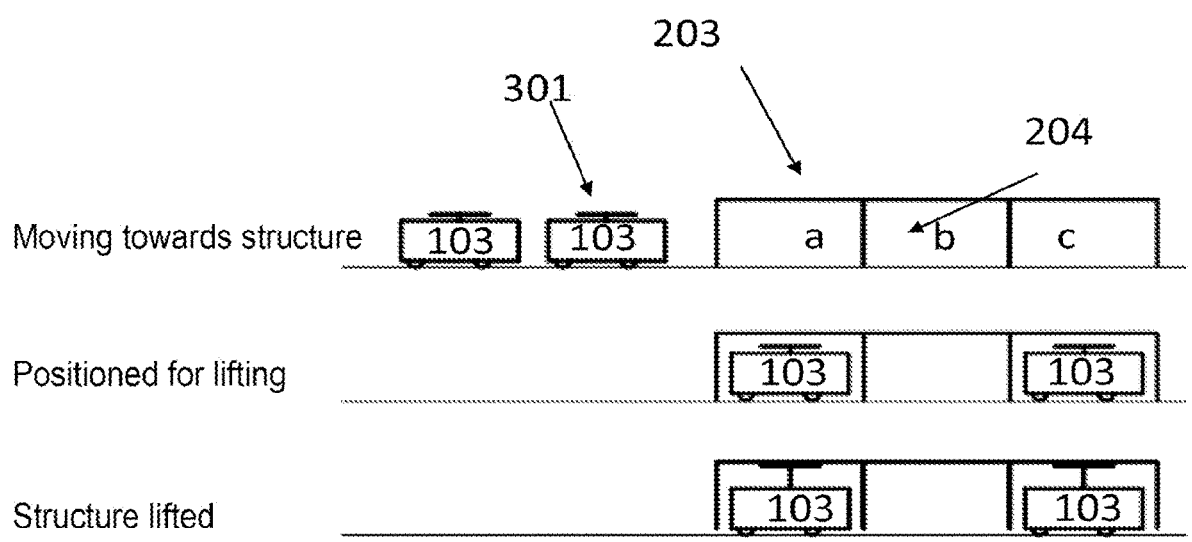
FIG. 3(c) illustrates robots and a structure according to an embodiment.

FIG. 3(b) and FIG. 3(c) illustrate an embodiment, wherein each robot 103 has a holonomic drive and a fixed lifting platform 301 on its top surface. The robot 103 is sized so that after moving towards the structure 201 203 it can fit underneath the structure and position itself in one of the defined lifting locations 204. In the system 101, all the inventory structures 102 rest on a floor surface and have defined lifting locations suitable for the lifting platform 301 of the robot 103 to engage with.

FIG. 3(b) shows a robot 103 moving toward a structure that comprises only a single lifting location and thus accommodates only a single robot 103 to be lifted. The single robot 103 moves under the structure 201 and into the lifting location 204. On receiving an instruction from the control system 104 to perform a lift operation, the fixed lifting platform 301 of the robot 103 raises and engages with the lifting location 204 to lift the structure 201.

FIG. 3(c) shows robots 103 moving toward a structure that comprises 9 lifting locations and accommodates up to 9 robots 103 for lifting, depending on the load to be lifted using the structure. FIG. 3(c) shows a cross section of the structure 203. One robot 103 moves under the structure 201 and into the lifting location 204 a (see FIG. 2(d)). Another robot 103 moves under the structure 201 and into the lifting location 204 c (see FIG. 2(d)). Two other robots 103 (not shown) move under the tray 201 and into the lifting locations 204 g and l (see FIG. 2(d)). On receiving an instruction from the control system to perform a lift operation, the fixed lifting platform 301 of each robot 103 raises and engages with the lifting location 204 to lift the structure 201.

Each robot 103 has an individual load capacity that determines how much that robot 103 can lift. The load that can be lifted by multiple robots 103 is the sum of the individual load capacity of each robot 103. The weight of the structure 102 may be counted as part of the load.

In an embodiment, the plurality of robots 103 may consist of identical robots 103. In this case, the load that can be lifted by multiple robots 103 is the individual load capacity of each robot 103 multiplied by the number of robots 103.

The number of robots 103 in the system 101 will at least equal the number of robots 103 required to lift the heaviest load on the largest size structure 102 of the plurality of structures 102.

In the system 101, a transport request 105 is received by the control system 104. The control system 104 then determines how many robots 103 to allocate to the transport request 105.

Figure 4A:
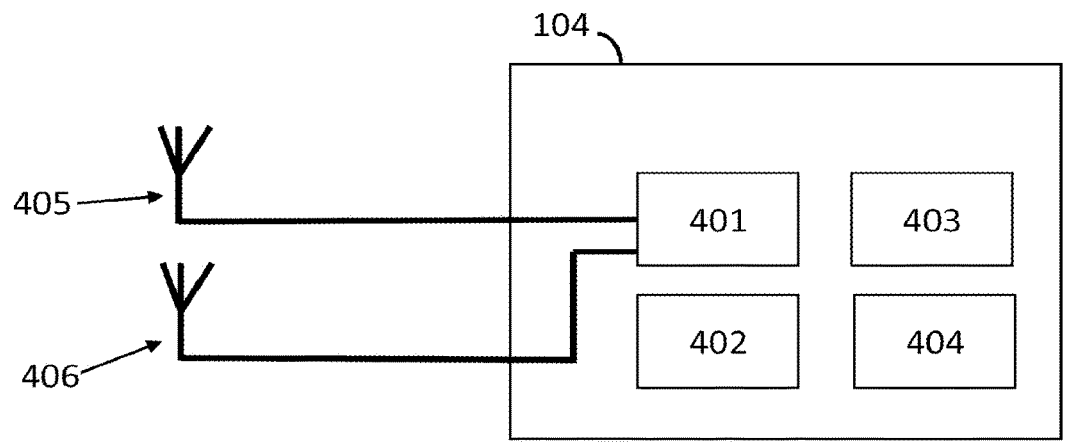
FIG. 4(a) depicts a control system according to an embodiment.

FIG. 4(a) shows a control system 104 according to an embodiment. The control system 104 may be external to the robots 103 and connected on a wireless network to communicate with the plurality of robots. Alternatively, the control system 104 may within a single robot 103 connected on a wireless network to communicate with the plurality of robots. In a further alternative embodiment the control system 104 may be a distributed control system, with processing power being contributed by a plurality of robots, by all robots in the system or, in as far as a particular transport task is concerned, by all robots presently contributing to the transport task.

The control system 104 comprises an input/output port 401, a microprocessor 402, a non-volatile memory 403 and a control system port 404. The RF input/output port 401 is communicatively connected to a plurality of antennas. FIG. 4(a) shows a first antenna 405 and a second antenna 406 communicatively connected to the RF input/output port 401. The RF input/output port 401 is configured to transmit and receive radio signals, preferably short range radio communication signals. The microprocessor 402 is coupled to non-volatile memory 403. Non-volatile memory 403 stores computer readable instructions that, when executed by the processor 402, cause the processor 402 to execute program steps that implement the methods described herein.

Whilst in the embodiment discussed above only two antennae are connected to the RF input/output port 401, it is emphasized that the RF input/output port 401 of the control system 104 may be communicatively coupled to more than two antennae. Furthermore, although in FIG. 4(a) the plurality of antennae (405, 406) are shown to be situated outside of, but connected to, the control system 104 it will be appreciated that in other embodiments the plurality of antennae (405, 406) are situated within the control system 104.

Figure 4B:
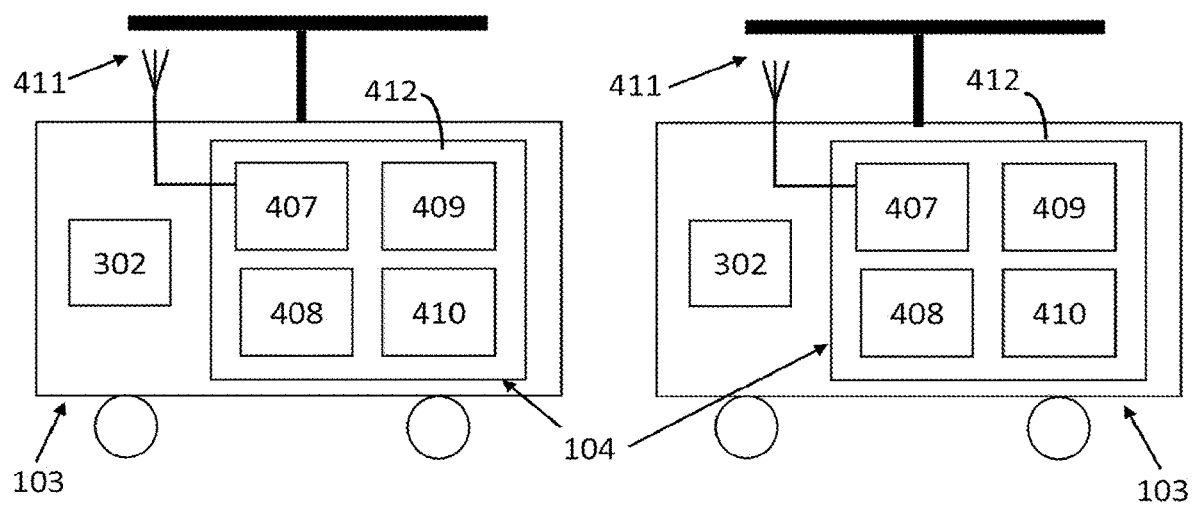
FIG. 4(b) depicts a control system according to another embodiment.

FIG. 4(b) shows a control system 104 according to an embodiment. The control system 104 may be a distributed control system that is distributed across the plurality of robots 103. The control system 104 consists of a plurality of communicating software agents 412. In one embodiment, one communicating software agent 412 is running on each robot 103 and communicating using a wireless network. Alternatively, multiple communicating software agents may be within a single robot 103. A processor executing software code to generate the communicating software agent 412 is, in an embodiment, connected to a RF input/output port 407, a microprocessor 408, a non-volatile memory 409 and a control system port 410. The RF input/output port 407 is communicatively connected to an antenna 411. The RF input/output port 407 is configured to transmit and receive radio signals, preferably short range radio communication signals. The microprocessor 408 is coupled to non-volatile memory 409. Non-volatile memory 409 stores computer readable instructions that, when executed by the processor 408, cause the processor 408 to execute program steps that implement the methods described herein.

Whilst in the embodiments discussed above only one antenna is connected to the RF input/output port 407, it is emphasized that the RF input/output port 407 of the communicating software agents 412 may be communicatively coupled to more than one antenna.

Figure 5:
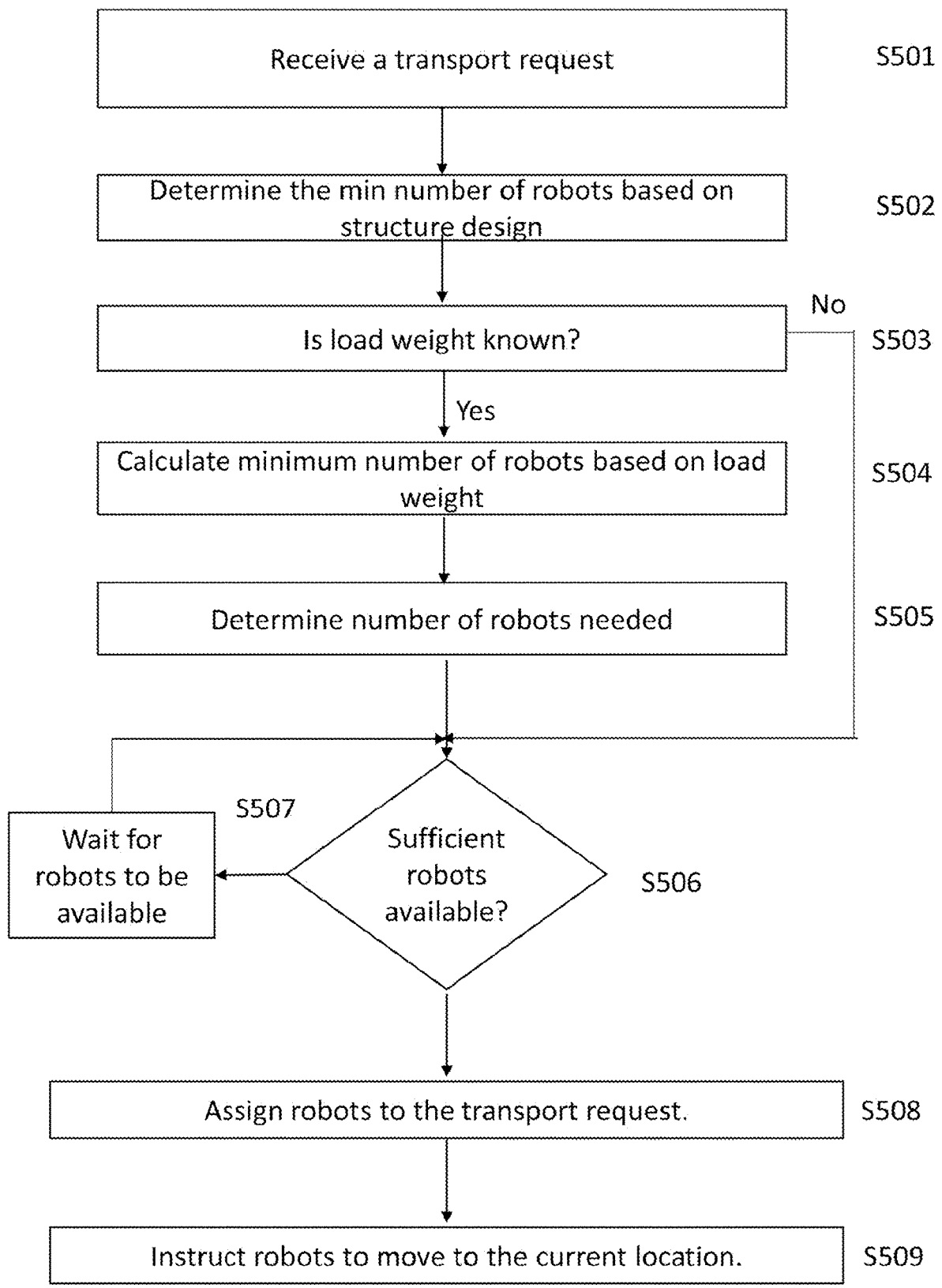
FIG. 5 is a flow chart depicting a method in accordance with an embodiment.

FIG. 5 details the steps by which robots 103 are allocated to a transport request 105 by the control system 104.

In S501, the transport request 105 to move a structure 102 from a current location to a new location is received by the control system 104. The transport request 105 includes information to allow the structure 102 to be identified. For example, the transport request 105 may include a structure ID. The transport request 105 will indicate the new location to which the structure 102 should be moved.

The transport request 105 may include information regarding the current location of the structure 102. Alternatively, this may be determined using the structure ID and a database of structure information or a map of the facility.

In S502, the control system 104 determines the structure design. The transport request 105 may include the structure design. Alternatively, the structure design can be determined from the structure ID, structure location, a database of structure information, and or a map of the facility. Alternatively, the control system 104 may instruct a robot 103 to move to the structure location to obtain information on the structure 102 so that the structure design can be determined.

The control system 104 then determines the minimum number of robots 102 to lift the structure based on the structure design. The minimum number of robots 102 to lift the structure may take into account any balancing issues of the structure, i.e. a number of robots needed to ensure the structure is balanced during transport to the new location.

For example, if the control system 104 determines that the structure design is a size 9 structure (for example, FIG. 2(d)), then the minimum number of robots 103 may be four.

In one embodiment, where the load weight is unknown, in S506 the system then checks if there are a sufficient number of robots 103 available to perform the transport. If so, the robots 103 are assigned to the transport request in S508.

In S509, the robots are then instructed to move to the current location of the structure.

If there are not a sufficient number of robots 103 available to perform the transport request, the control 104 system waits in S507 until sufficient robots 103 are available.

In an embodiment, in addition to the structure ID or structure design, the transport request 105 may also include the weight of the load to be transported on the structure 102. Alternatively, the transport request 105 may include a reference to enable the weight of the load to be determined, for example from a database.

FIG. 5 further details the steps by which robots 103 are allocated to a transport request 105 when the transport request 105 further includes the load weight and the structure design.

In S502, based on the structure design, the control system 104 can determine the minimum number of robots 103 for structure design to lift the structure 102.

For example, if the control system determines that the structure is a size 9 structure, then the minimum number of robots may be four.

As the weight is known in S503, the control system 104 then calculates the minimum number of robots 103 to lift the structure 102 for the given the load weight in S405.

In the case where the robots are identical, this can be calculated as ceil(load weight+structure weight)/load per robot.

For example, in S504, for a load weight of 130 kg, a structure weight of 20 kg and a load capacity of each robot of 30 kg, the number of robots 103 needed may be calculated to be five.

Next, in S505, the control system 104 determines the number of robots 103 needed as the maximum of the minimum number of robots for structure design and the minimum number of robots for the load weight), i.e. max (min_robots_structure, min_robots_weight).

In the example of a transport request 105 for a size 9 structure 203 where the load weight is 130 kg, the structure weight is 20 kg and a load capacity of each robot is 30 kg, the number of robots needed may be calculated to max (min_robots_structure, min_robots_weight)=max(4, 5)=5. Therefore, although the minimum number of robots 103 required to carry a size 9 structure 203 may be four, the load weight determines that five robots are needed.

Again, in S506 the system then checks if there are a sufficient number of robots 103 available to perform the transport. If so, the robots 103 are assigned to the transport request in S508.

In S509, the robots 103 are then instructed by the control system 104 to move to the current location of the structure.

Each of the robots 103 are dispatched to the current location of the structure to perform the transport request. The path to the current location from each robots 103 location may be determined by the control system 104 and path instructions may be provided to each robot. Alternatively, the path to the current location may be determined by each robot 103.

Figure 6:
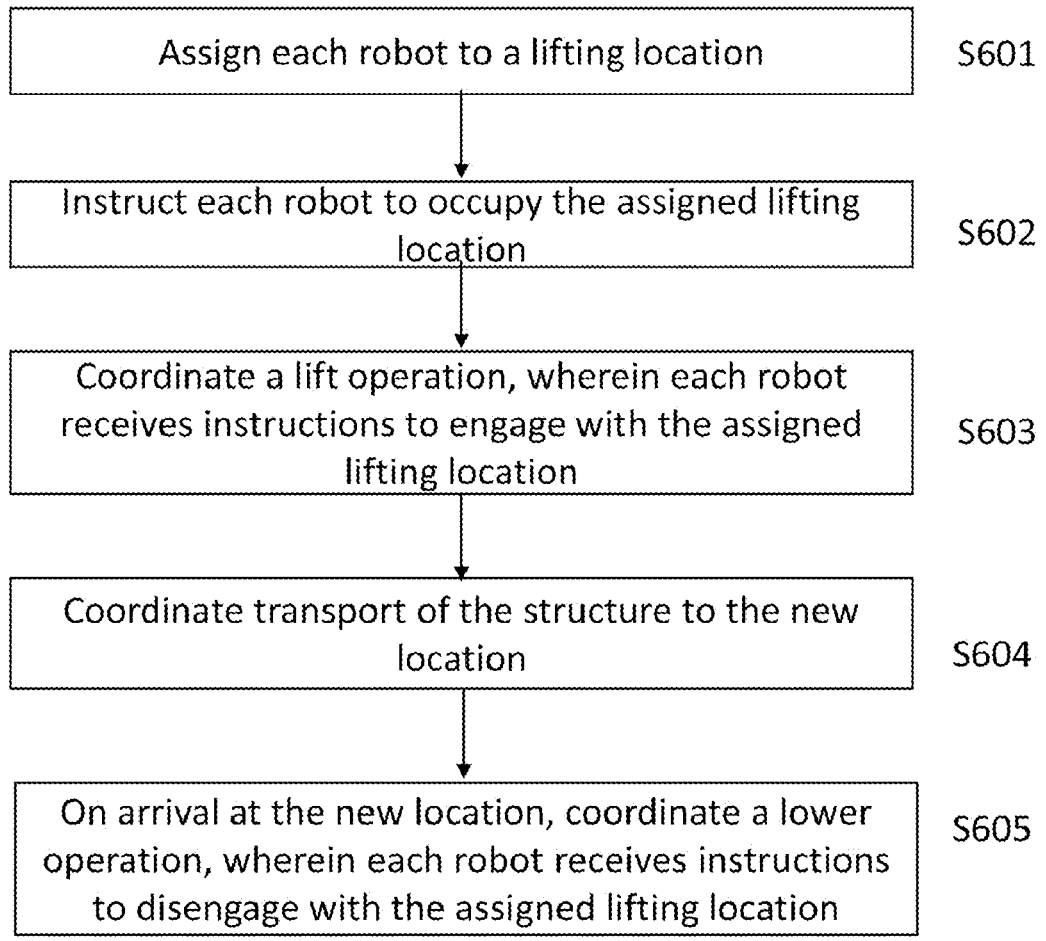
FIG. 6 is a flow chart depicting a method in accordance with an embodiment.

FIG. 6 details the steps taken in the fulfilment of a transport request 105 once the robots 103 have arrived at the current location of the structure 102.

The control system 104 may assign each robot to a lifting location 204 associated with the structure 102. After arriving at the current location of the structure, each robot 103 may receive, from the control system 104, instructions to occupy the assigned lifting location 204 (S602). Alternatively, each robot may have instructions detailing the assigned lifting location 204 to position itself in prior to arriving at the current location.

In S503, each robot 103 takes their position in a lifting location 204.

In S603, the control system then coordinates a lift operation of the structure. To do this each robot 103 receives instruction to engage with the assigned lifting location 204 to perform a coordinated lift of the structure 102.

Once the structure 102 is lifted by the robots 103 after S603, the control system coordinates transport of the structure to the new location in S604. The path to the new location may be determined by the control system 104 and path instructions may be provided to the robots 103 by the control system 104.

In S605, when the robots 103 arrive with the structure 102 at the new location, the control system may coordinate a lower operation of the structure 102. In the lower operation, the control system 204 may provide each robot 103 with instructions to disengage with the assigned lifting location 204 to perform a coordinated lowering of the structure 102. Finally, once the move is complete, the robots 103 may move out of the lifting locations 204 to await further instructions from the control system 104.

Figure 7:
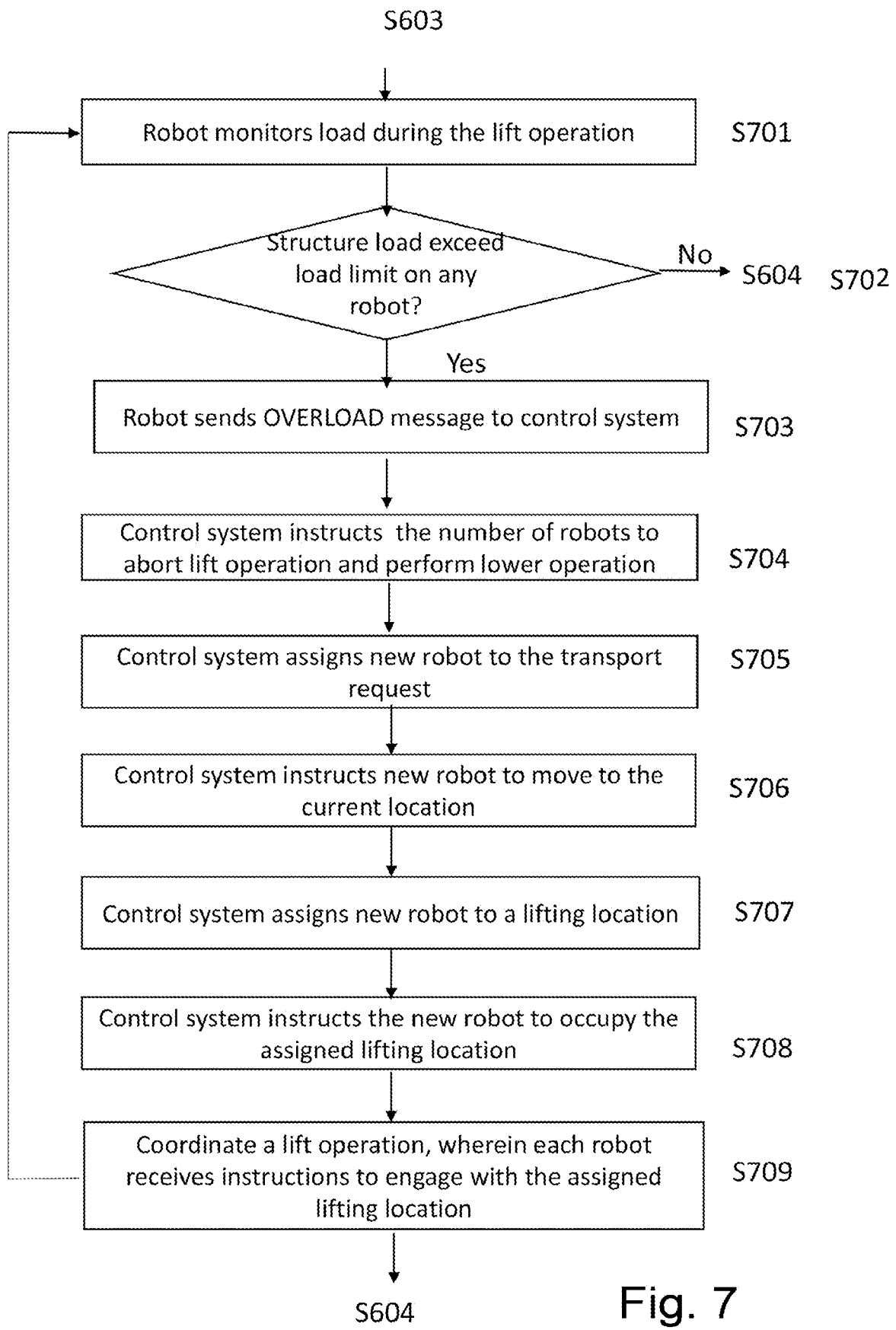
FIG. 7 is a flow chart depicting a method in accordance with an embodiment.

FIG. 7 illustrates an embodiment where the weight of the inventory structure 102 load is not known. In the embodiment only the minimum number of robots 103 needed to move the structure 102 of particular design is known. For example, with reference to FIG. 3(*b*), when the weight of the inventory structure load is not known, four robots may be dispatched to lift a size 9 structure. The robots 103 may receive instructions from the control system 104 to occupy the lifting locations 204 a, c, g and i (see FIG. 2(*d*)).

In this embodiment, the lifting mechanism of the robots 103 may have a means of determining a load of the structure as experienced by that robot. For example, the lifting mechanism may comprise of sensors to indicate the force exerted by the inventory load on each robot 103.

The robots will occupy the lifting locations a, c, g and i. Following an instruction from the control system 104, the robots will perform the lift operation, wherein each robot 103 engages with the lifting location 204 (see S603 of FIG. 6).

In S701, as each robot 103 engages with the lifting location 204, they simultaneously monitor the load of the inventory structure experience by that robot. The weight of the inventory structure load can be determined by measuring the applied force and displacement, or other indicators of the weight of the inventory structure load.

In S702, if the weight of the inventory structure load exceeds a certain load limit on any of the robots 103, then there are insufficient robots 103 to lift the inventory structure load. For example, if the applied force for a given displacement exceeds a certain limit on any of the robots 103 assigned to the transport request 105, then there are insufficient robots 103 for the inventory structure load. The load limit may be the load capacity of a robot 103.

In S703, the robot or robots 103 that have exceeded this limit send the message OVERLOAD to the control system 104. On receiving the OVERLOAD message, the control system 104 then instructs all robots to abort the lift operation and perform a lower operation to lower the structure (S704).

In S705, the control system 104 then assigns at least one new robot 103 to the task. The control system instructs the new robot(s) to move to the current location of the structure (S706).

In S707, the control system assigns the new robot 103 to a lifting location. The control system then instructs the new robot to occupy the assigned lifting location 204 (S708).

This process will continue until there are sufficient robots 103 for the load, at which point the method proceeds as previously in FIG. 6 (from S604) until the transport request 105 has completed.

In an embodiment, the weight of the inventory structure load is known, but the inventory structure load on the structure 102 may be unbalanced. An unbalanced inventory structure load is a load where the centre of gravity is not near to the centre of the footprint of structure 102. In such a case, if the lifting robots 103 are evenly distributed around the structure 102, some robots 103 will have a higher load and some a lower load, to the point that the individual load capacity of a robot is exceeded. In this case, system 101 is able to compensate for an unbalanced inventory structure load by repositioning the robots 103.

Figure 8:
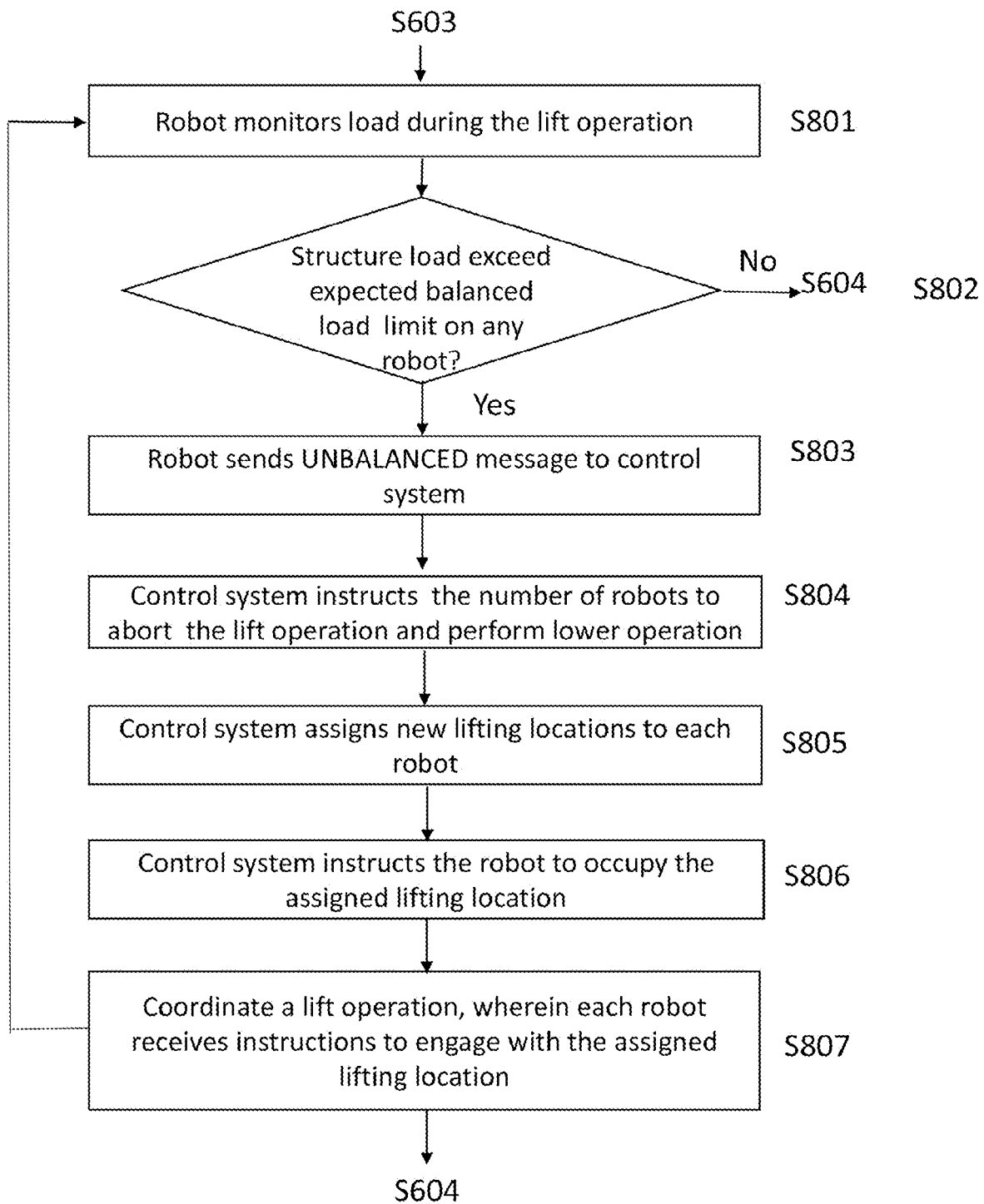
FIG. 8 is a flow chart depicting a method in accordance with an embodiment.

FIG. 8 details a method in the case of an unbalanced inventory structure load. The lifting mechanism of each robot 103 has a means of measuring the applied force and displacement. Each robot 103 performs a lift operation while monitoring the load applied to itself.

As the weight of the inventory structure load is known, and the structure design is known, the balanced load limit that should be experienced by each individual robot for a balanced inventory structure load can be determined. The balanced load limit that should be experienced by each individual robot may be determined by the control system 104 from the weight of the inventory structure load, the structure design, the individual load limit or load capacity of each robot and the number of robots assigned to the transport request 105. The balanced load limit that should be experience by each individual robot is then provided to each robot 103 by the control system.

Alternatively, each robot may receive information from the control system 104 including the weight of the inventory structure load, the structure design, the individual load limit or load capacity of each robot and the number of robots assigned to the transport request 105. Each robot may then determine the balanced load limit that that robot should experience during the lift.

In S801, each robot monitors the load experienced by that robot during the lift operation. In S802, each robot checks if the load experienced by that robot 103 exceeds the expected balanced load limit on that robot 103. If the load has exceeded the expected balanced load limit, that robot sends an UNBALANCED message to the control system 104 (S803).

Alternatively, each robot 103 may only send the UNBALANCED message to the control system 104 if the load experienced by that robot exceeds the expected balanced load limit by a given margin. The given margin may be a fixed amount or a percentage of the expected balanced load limit. The given margin may be determined by the control system 104 with reference to the details of the specific transport request 105, such as inventory structure load weight, or it may be a fixed value. Alternatively, the given margin may be determined by each robot 103 with reference to the details of the specific transport request 105, such as inventory structure load weight, or it may be a fixed value.

In S804, on receiving an UNBALANCED message, the control system 104 then instructs the robots 103 to abort the lift operation and perform a lower operation to lower the structure 102. The robots then disengage with the lifting location to lower the structure.

In S805, the control system 104 recalculates new lifting locations 204 for each robot 103, such that the load of the structure may be more evenly spread over the team of robots 103. The control system 104 then assigns each robot 103 to a new lifting location information. In S806, the control system instructs the robots 103 to occupy their assigned lifting locations 204. At this point, the team of robots attempt the lifting operation again (S807).

In a further embodiment, using standard techniques of concurrent processing, the control system 104 maintains a shared distributed database of the current locations of the inventory structures 102 and the robots 103. It also maintains a shared map of the logistic facility in which the system 101 is utilised, such as a warehouse.

The map may include information regarding obstacles in the facility. The map may indicate the best route for a robot 103 to take to get a location, e.g. the current location of the structure 102, or the new location. The map may indicate the location of structures 102 in the facility. The map may indicate the location of robots 103 in the facility.

Each robot 103 may be equipped with a plurality of sensors that can be used to update the shared map and the database. The sensors may include video cameras, GPS, and other sensors. The sensors may provide information on obstacles within the facility. The sensors may also be used by the robots 103 to move from one location to another, e.g. to the current location of the structure 102, or to the new location.

In the distributed control system, all robots 103 are linked to a wireless communications fabric which supports one-to-many unidirectional (broadcast) and one-to-one communication links. There are many existing protocols that support this, such as ZeroMQ.

Referring to FIG. 1, a transport request 105 to the system 101 may arrive in the form of a one-to-many broadcast message REQUEST. The REQUEST may include an identification number (REQUEST ID) associated with the transport request 105. The identification number (REQUEST ID) may identify a time at which the transport request 105 was made. For example, the REQUEST ID may be a unique, monotonically increasing timestamp UID (unique identification number).

The transport request 105 REQUEST may also provide the new location of where a structure 102 should be moved. The REQUEST 105 may include the current location of the structure 102. The information identifying the new location and current location may have varying levels of abstraction, depending on the embodiment. For example, the current location of a structure 102 may be determined from the shared map of the facility.

Each robot 103 has a state, which may be IDLE, LEADER_RECRUITING, LEADER_FULFILLING, FOLLOWER.

Each robot 103 has a set of messages it may send in one-to-one fashion between robots, which are VOLUNTEER, ACCEPT, LIFT, LOWER, and RELEASE. In addition, a robot 103 may broadcast the message RECRUIT, which can be received by all robots 103.

Finally, a robot 103 may send the message FULFILLED to the originator of the REQUEST broadcast as confirmation 106 that the transport request 105 has been completed.

All messages are tagged with the REQUEST ID. A REQUEST message is repeated at regular intervals until it is FULFILLED.

Figure 9:
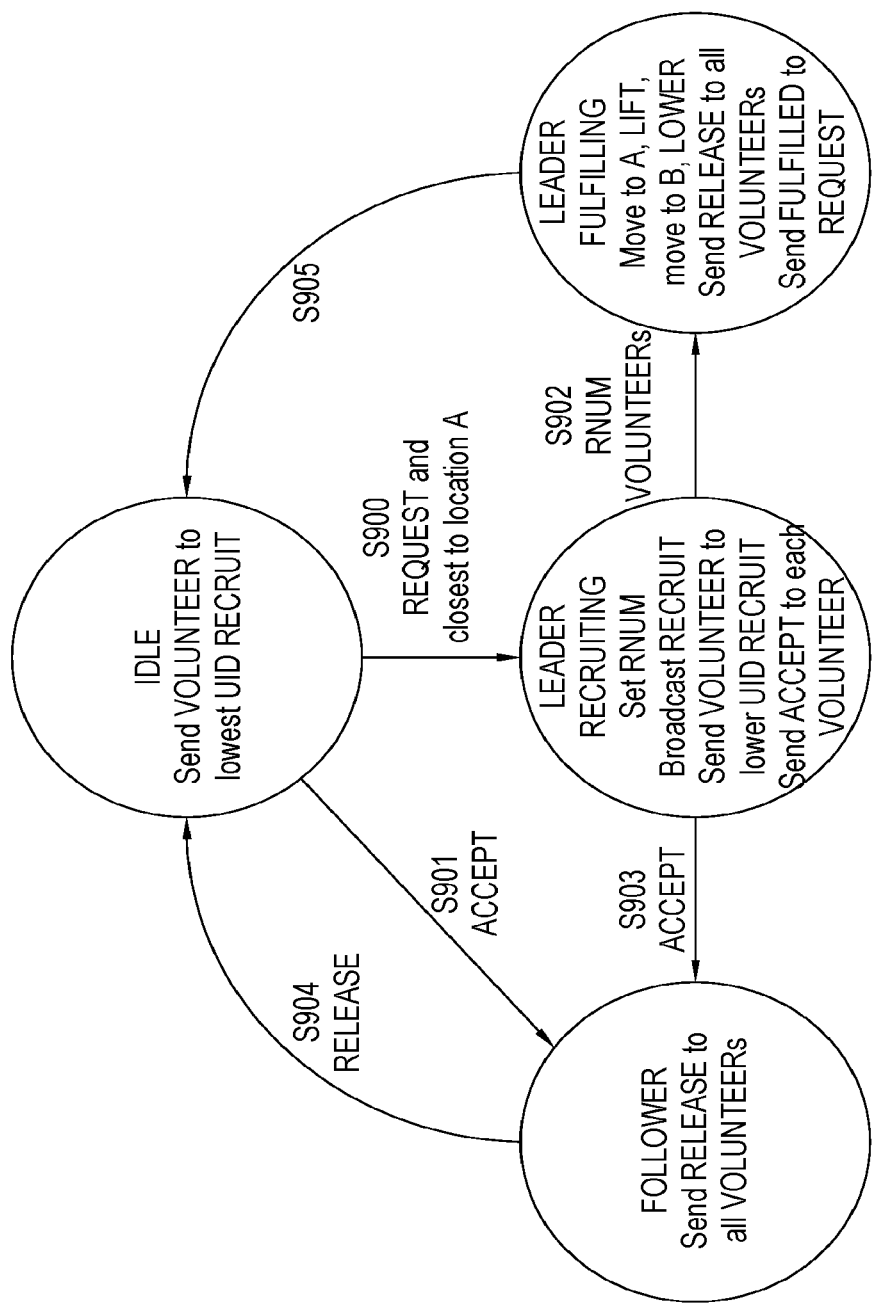
FIG. 9 is a flow chart depicting a method in accordance with an embodiment.

With reference to FIG. 9, when a REQUEST broadcast message is received by a robot 103, if that robot 103 is in state IDLE, it queries the shared database in order to determine whether it is the closest IDLE robot to the current location of the structure 102 which is to be moved. Only one robot 103 will be closest to the current location of the structure 102, this robot 103 changes state to LEADER_RECRUITING (S900).

The LEADER_RECRUITING robot broadcasts the message RECRUIT to all the robots 103. It repeats this broadcast at regular intervals while in the state LEADER_RECRUITING. The LEADER_RECRUITING robot also knows from the shared database how many robots 103 are required to fulfil the transport request 105 and move the structure 102 and keeps this value in the variable RNUM.

All robots 103 that are in either state IDLE, or LEADER_RECRUITING wait for broadcasts of RECRUIT. If the robot is IDLE, it sends message VOLUNTEER to the LEADER_RECRUITING robot broadcasting RECRUIT and the LEADER_RECRUITING robot may send the message ACCEPT in return (S901).

If no ACCEPT message is received within a certain time the IDLE robot returns to waiting for broadcasts of RECRUIT.

The RECRUIT message may include the REQUEST ID. If the IDLE robot receives RECRUIT from multiple robots 103, the IDLE robot sends VOLUNTEER to the robot broadcasting the RECRUIT message with the REQUEST ID indicating the earliest transport request 105. For example, if the REQUEST ID is a unique, monotonically increasing timestamp UID, the IDLE robot sends VOLUNTEER to the robot broadcasting the RECRUIT message with the lowest REQUEST ID.

At any time there may be more than one robot in a state LEADER_RECRUITING, each LEADER_RECRUITING robot dealing with a single transport request 105. If a first LEADER_RECRUITING robot broadcasting RECRUIT receives from a second LEADER_RECRUITING robot another broadcasting RECRUIT with lower ID, it sends VOLUNTEER to the second LEADER_RECRUITING robot.

As VOLUNTEER offers arrive at a robot in state LEADER_RECRUITING, it replies with ACCEPT until it has the required number of robots RNUM to fulfil the request at which point it changes state to LEADER_FULFILLING (S902) and thus stops broadcasting RECRUIT.

Any robot that receives the ACCEPT message changes from state IDLE (S901), or from state LEADER_RECRUITING, to state FOLLOWER (S903).

Any robot that receives a VOLUNTEER message that is not in state LEADER_RECRUITING will ignore the message.

Any robot that changes state from LEADER_RECRUITING to state FOLLOWER will send the message RELEASE to all robots that it previously recruited with ACCEPT messages.

Any robot 103 in state FOLLOWER that receives the message RELEASE will change to state IDLE (S904).

A robot 103 in state LEADER_FULFILLING now has sufficient robot 103 recruits to complete the transport request 105. It navigates to the current location of the structure 102, coordinates its followers to lift the inventory structure 102 by sending the message LIFT to each FOLLOWER robot, then moves in coordinated fashion with the FOLLOWER robots to the new location.

At the new location, the FOLLOWER robots under instruction from the LEADER_FULFILLING robot then perform a coordinated lowering to complete the transport request 105 by sending the message LOWER to each follower. At this point, it sends the message RELEASE to each of the recruited FOLLOWER robots, then sends the message FULFILLED 106 to the originator of the REQUEST. The LEADER_FULFILLING robot then changes state to IDLE (S905). The transport request 105 has now been successfully fulfilled, and all the robots involved in that transport request 105 are now in the IDLE state and available for further requests.

The distributed design of this embodiment for allocating and dispatching robots allows there to be multiple different REQUESTs being fulfilled at any one time, limited only by the number of physical robots.

The prioritising of transport requests according to the identification numbers (REQUEST ID) guarantees that all requests will eventually be fulfilled. This is true even with imperfect broadcast communications, since at any point when a RECRUIT broadcast becomes visible, it will take priority over later REQUESTs that have higher IDs.

In the previous embodiment, the number of robots required for the logistics operation is known because the distributed database maintained across the robots 103 knows both the structure design and the weight of the load. In another embodiment where the weight of the inventory structure load is not known, only the minimum number of robots 103 needed to move the particular structure design can be known.

Figure 10:
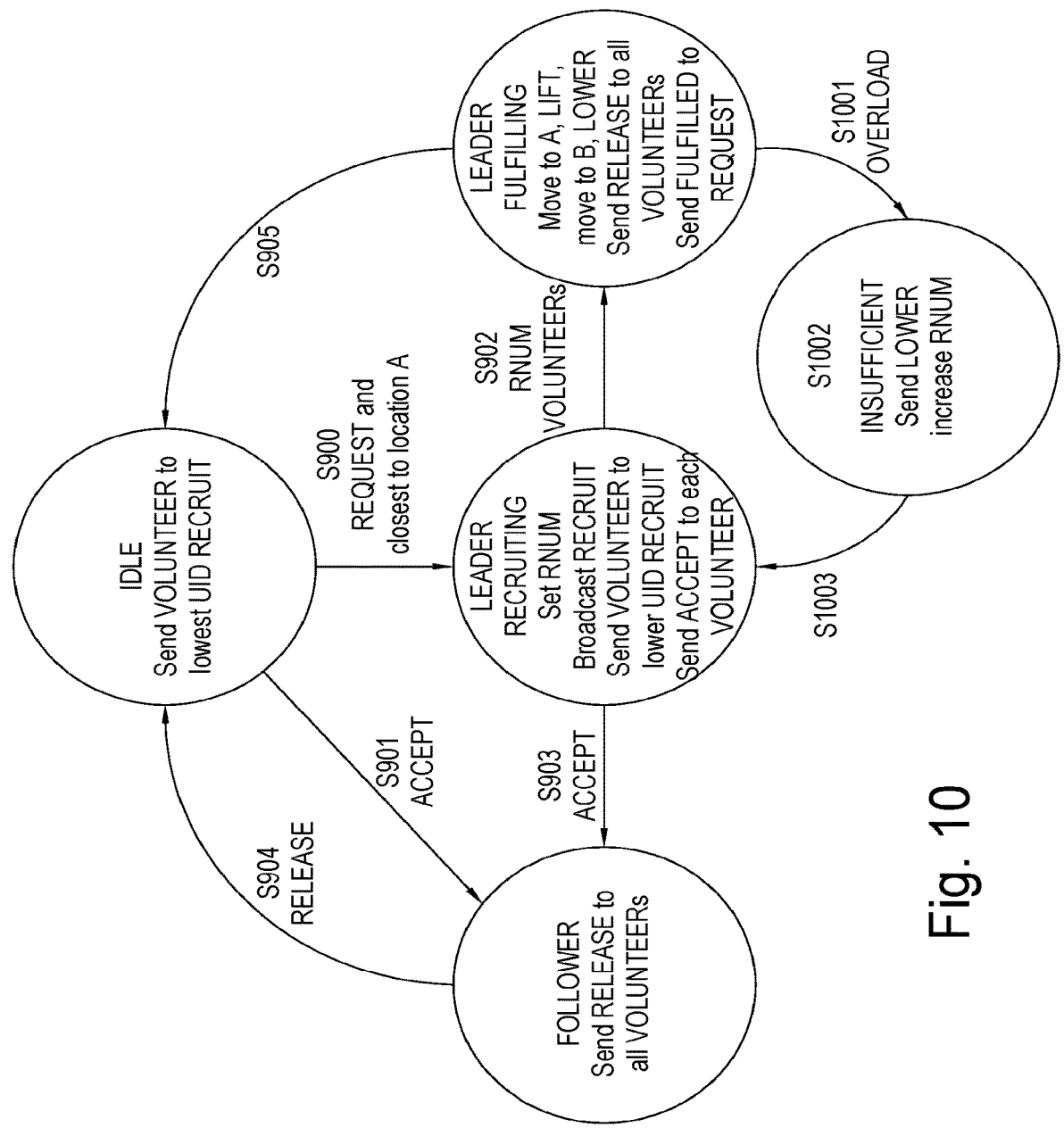
FIG. 10 is a flow chart depicting a method in accordance with an embodiment.

In this embodiment, as illustrated in FIG. 10, the distributed request handling algorithm proceeds as described above with reference to FIG. 9 until the leader robot handling the request reaches state LEADER_FULFILLING, at which point it has the minimum robot recruits (FOLLOWERS) sufficient to move the structure 102 with no load.

In this embodiment, the lifting mechanism of the robots 103 has a means of measuring the load as experienced by that robot 103. For example, the robot 103 can measure the applied force and displacement. There is also an additional possible message OVERLOAD and robot state INSUFFICIENT. The team of robots 103 position themselves at suitable lifting locations 204 under the structure 102 and the LEADER_FULFILLING robot sends the message LIFT. The robots now attempt to lift in a coordinated way while monitoring the applied force and displacement. If the applied force for a given displacement exceeds a certain limit on any of the robots in the team, there are insufficient robots for the load.

The robot or robots 103 that have exceeded this limit send the message OVERLOAD to the LEADER_FULFILLING robot (S1001) which changes to state INSUFFICIENT then sends the message LOWER to its team of FOLLOWER robots and the lifting operation is aborted (S1002).

The INSUFFICIENT robot then increases the value RNUM by some amount which in the simplest embodiment can be one (S1002), and moves back to state LEADER_RECRUITING (S1003) and starts broadcasting RECRUIT again.

Further robots reply as in the previous embodiment until the robot team size has reached the new value of RNUM. At this point, the state of the LEADER_RECRUITING robot changes to LEADER_FULFILLING and again attempts the lifting task. This process will continue until there are sufficient robots 103 for the load, at which point the algorithm proceeds as in the previous embodiment until the logistics operation has completed.

Because of the priority given to lower, older ID values, even if there are no robots initially available, the operation is guaranteed to complete as long as the system has sufficient robots in total.

In a further embodiment, the weight of the structure and load is known, but the system is able to compensate for an unbalanced load, that is, a load where the centre of gravity is not near to the centre of the structure.

In such a case, if the lifting robots are evenly distributed around the structure, some robots will have a higher load and some a lower load, to the point that the maximum load of a robot is exceeded. As with the second embodiment above, the lifting mechanism has a means of measuring the applied force and displacement. There is also an additional message UNBALANCED and robot state REPOSITION.

Figure 11:
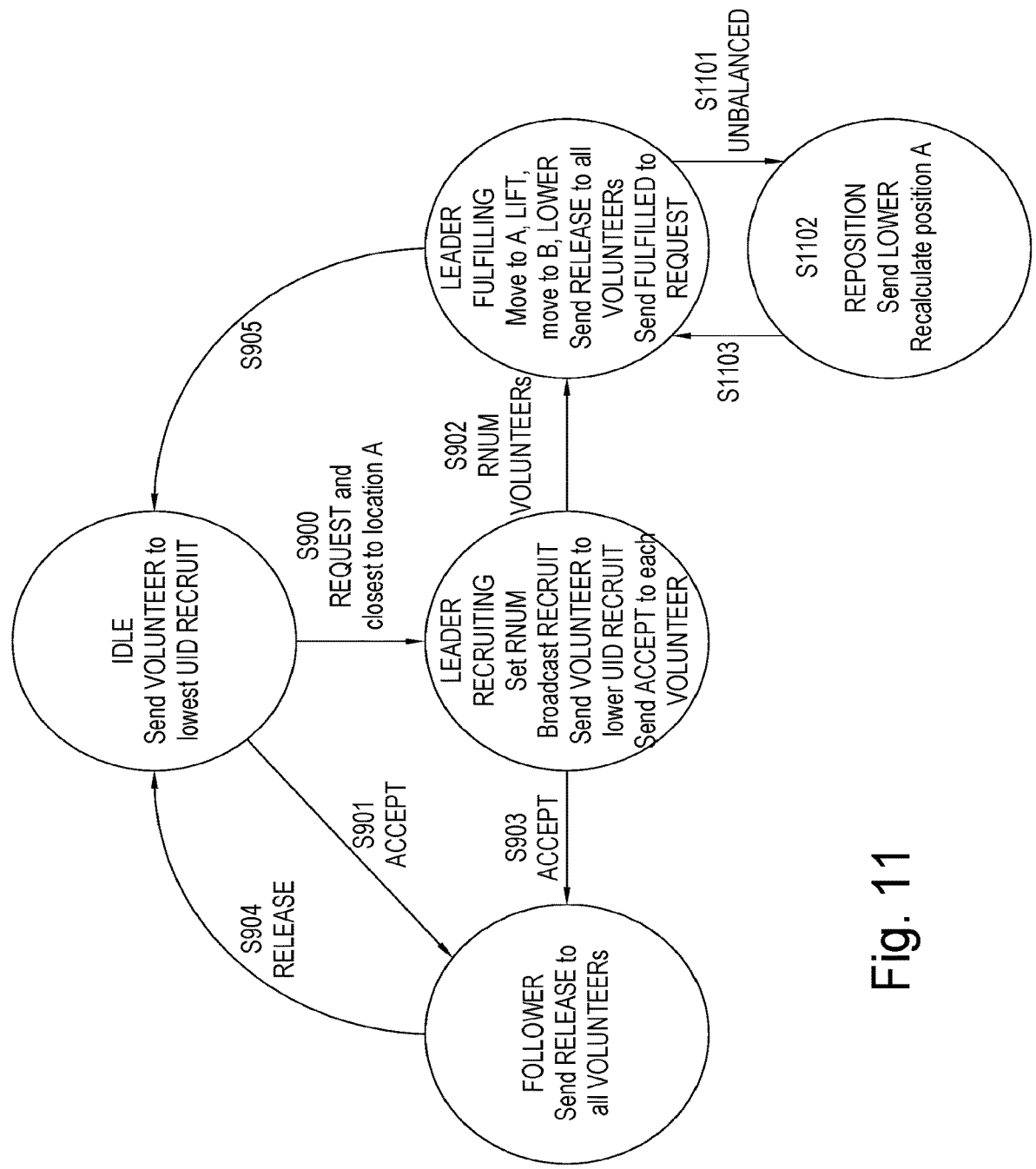
FIG. 11 is a flow chart depicting a method in accordance with an embodiment.

The operation, as illustrated in FIG. 11, proceeds as in FIG. 9 until the LEADER_FULFILLING robot and its FOLLOWER robots have reached the lifting location 204 of the structure 102 at the current location of the structure 102 and the LEADER_FULFILLING robot has sent the message LIFT.

The robots 103 attempt a coordinated lift while monitoring the applied force and displacement. If the applied force for a given displacement exceeds that expected for a balanced load by some margin on any robot 103, that robot 103 sends the UNBALANCED message the LEADER_FULFILLING robot (S1101) which changes state to REPOSITION and sends the message LOWER to the team and the lifting operation is aborted (S1102). The REPOSITION robot that recalculates the new required locations of the team of robots around the current location of the structure and returns to state LEADER_FULFILLING (S1103).

At this point, the team of robots 103 move to the new lifting locations 204 around the structure 102 and attempt the lifting operation again, this time positioned such that the load is more evenly spread over the team of robots 103.

In an embodiment, the disclosed system and method uses many identical and/or small robots 103. These are sufficient in size to move a small inventory structure 102 singly, or a larger inventory structure 102 as a collective, moving in a coordinated fashion. It is possible to have a plurality of structures 102 with different designs, such as different sized inventory structures 102, reducing wasted space, and only a single size and design of robot, making possible economies of scale, reducing purchase and maintenance costs.

In another embodiment, by using distributed algorithms running on the robots, there is no need for a central control system, increasing resilience.

Robotic inventory transport systems consist of fixed size inventory structures, trays or pallets or pods or totes (all terms used for passive carriers on or in which inventory is placed) that are transported between locations by a single size of robot, or different sized structures that are transported by different robots.

The problem with conventional systems is that the fixed sized structure must be sized for the largest load, or there must be multiple sized robots for different size structures, or the robot must be sized for the largest sized structure. This increases costs, either by redundancy in space in the structure, or load capacity of the robot, or by having multiple robot types.

By using multiple robots acting in a coordinated fashion, the disclosed embodiments can transport different sized structures by using a different number of robots, depending on the structure size and load. Since all the robots may be identical, they are cheaper to produce. Since there are multiple structure designs, there is less wasted load capacity. Since the individual robot capacity only has to be sized for a submultiple of maximum load, again cost is reduced.

The above embodiments detail a set of inventory structure designs of different sizes that can be moved by different numbers of robots, a set of robots that can physically dock with the structures and move individually or in a coordinated collective way, each robot having a computer and wireless communications and a controlling software system, running in a distributed manner on the computers of the robots, which accepts requests and despatches robots to fulfil the requests.

The invention applies to materials handling systems, specifically to the movement of inventory structures from location to location. It consists of three parts, a plurality of inventory structures of a plurality of different sizes and designs, and a plurality of robots numbering at least the number required to lift the heaviest load on the largest structure, and a controlling distributed software system running on the robots.

The system has the following structural features:

a) Infrastructure-less System—The proposed system does not rely on any infrastructure support (e.g., a centralized management system).

b) Out-of-box Solution—The proposed solution can be deployed in an out-of-box fashion as it does not require any pre-configuration of logistic facilities such as wire guidance, floor labels, or magnetic tapes.

c) Swarm Intelligence—Unlike state-of-the-art centralized logistic solutions, the proposed solution leverages swarm intelligence for distributed decision making pertaining to almost all aspects of transporting inventory items.

d) Cooperative Transport—Multiple robots cooperate to transport goods in logistic facilities. Such cooperation leverages ultra-low latency wireless protocols for synthesizing a finite number of geometric formations and collectively maintaining a desired formation during transport.

e) Multi-sensory Information Fusion—Robots may fuse information from different sensory capabilities to make robust decisions pertaining to different aspects of transporting inventory items.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A control system connected in a wireless network, the control system comprising:
   a receiver configured to receive a transport request indicating a structure, of a plurality of structures, to be transported to a target location, the structures being of different sizes and shapes, the structures being configured to hold a plurality of items for transport; and
   processing circuitry configured to
      determine, based on the transport request, a number of robots to assign to the transport request, the robots being connected in the wireless network;
      coordinate a lift operation, by the number of robots, of the structure, wherein during the lift operation a robot engages with a lifting location associated with the structure, the structure having at least one lifting location, a number and positions of lifting locations of the structure depending on a size and a shape of the structure; and
      coordinate transport, by the number of robots, of the structure to the target location.

2. The control system according to claim 1, wherein the control system is within a single control robot, and the control robot is within the robots.

3. The control system according to claim 1, wherein the control system is a distributed system including a plurality of control agents, and a control agent of the plurality of control agents, is within the robot of the robots.

4. The control system according to claim 1, wherein the processing circuitry is further configured to:
   determine the number of lifting locations associated with the structure; and
   assign the lifting location to the robot of the number of robots.

5. The control system according to claim 1, wherein the transport request includes information on the size and the shape of the structure, wherein the processing circuitry is further configured to
   determine the number of lifting locations based on the size and the shape of the structure; and
   determine the number of robots based on the number of lifting locations.

6. The control system according to claim 1, wherein the structure is configured so that at least a part of the robot occupies the lifting location for lifting the structure, and wherein the robot includes a lifting platform, the lifting platform being configured to engage with the lifting location during the lift operation.

7. The control system method according to claim 5, wherein the transport request includes information on a load of the structure, wherein the processing circuitry is further configured to determine the number of robots based on the size and the shape of the structure and on the load of the structure.

8. The control system according to claim 1, wherein
   the receiver is configured to receive, from the robot, an overload message indicating that the robot detects a load exceeding a load limit, wherein the processing circuitry is further configured to, in response to a reception of the overload message:
   instruct the number of robots to abort the lift operation and perform a lower operation, wherein during the lower operation the robots disengage with the assigned lifting location;
   assign an additional robot to the number of robots;
   instruct the additional robot to move to a current location in which the structure is located; and
   assign the additional robot to a lifting location associated with the structure.

9. The control system according to claim 1, wherein
   the receiver is configured to receive, from the robot, an unbalanced message indicating that the robot detects a load exceeding a balanced load limit, wherein the processing circuitry is further configured to, in response to a reception of the unbalanced message:
   instruct the number of robots to abort the lift operation; and
   assign at least one robot of the number of robots to a new lifting location associated with the structure.

10. A system, comprising:
   a plurality of structures configured to hold items for transport;
   a plurality of robots connected in a wireless network; and
   a control system connected in the wireless network, the control system including
      a receiver configured to receive a transport request indicating a structure, of the plurality of structures, to be transported to a target location, the structures being of different sizes and shapes, the structures being configured to hold a plurality of items for transport; and processing circuitry configured to
  determine, based on the transport request, a number of robots to assign to the transport request, the robots being connected in the wireless network;
  coordinate a lift operation, by the number of robots, of the structure, wherein during the lift operation a robot engages with a lifting location associated with the structure, the structure having at least one lifting location, a number and positions of lifting locations of the structure depending on a size and a shape of the structure; and
  coordinate transport, by the number of robots, of the structure to the target location.

11. A non-transitory computer-readable storage medium storing instructions executable by a computer processor and causing the processor to perform, when executing the instructions, steps of:
  receiving a transport request indicating a structure, of a plurality of structures, to be transported to a target location, the structures being of different sizes and shapes, the structures being configured to hold a plurality of items for transport;
  determining, based on the transport request, a number of robots to assign to the transport request, the robots being connected in a wireless network;
  coordinating a lift operation, by the number of robots, of the structure, wherein during the lift operation a robot engages with a lifting location associated with the structure, the structure having at least one lifting location, a number and positions of lifting locations of the structure depending on a size and a shape of the structure; and
  coordinating transport, by the number of robots, of the structure to the target location.

12. A robot, comprising:
  a receiver configured to receive instructions from a control system connected in a wireless network, the instructions indicating a structure, of a plurality of structures configured to hold items for transport, the structures being of different sizes and shapes; and
  a drive to
    move to a current location, based on the instructions, the structure of the plurality of structures being located in the current location;
    occupy an assigned lifting location associated with the structure, of the plurality of structures, based on the instructions; and
    engage with the assigned lifting location to perform a lift operation based on the instructions, the lifting location being associated with the structure, the structure having at least one lifting location, a number and positions of lifting locations of the structure depending on a size and a shape of the structure.

13. The robot of claim 12, further comprising processing circuitry configured to
  determine a load of the structure detected by the robot; and
  when the load detected by the robot exceeds a load limit, generate an overload message for use by the control system.

14. The robot of claim 12, further comprising processing circuitry configured to
  determine a load of the structure detected by the robot; and
  when the load detected by the robot exceeds a balanced load limit, generate an unbalanced message for use by the control system.

15. A robot, comprising:
  a receiver configured to receive a transport request indicating a structure, of a plurality of structures, to be transported to a target location, the structures being of different sizes and shapes, the structures being configured to hold a plurality of items for transport, the robot being for transporting the items; and
  processing circuitry configured to
    determine, based on the transport request, a number of robots to assign to the transport request, the robots being connected in a wireless network in which a control system is connected, the control system being a distributed system including a plurality of control agents, a control agent of the control agents being within the robot;
    coordinate a lift operation, by the number of robots, of the structure, wherein during the lift operation the robot engages with a lifting location associated with the structure, the structure having at least one lifting location, a number and positions of lifting locations of the structure depending on a size and a shape of the structure; and
    coordinate transport, by at least one robot of the number of robots, of the structure to the target location.

16. The robot of claim 15, wherein the processing circuitry is further configured to:
  determine a number of lifting locations associated with the structure; and
  assign the lifting location to the at least one robot of the number of robots.

17. The robot of claim 15 wherein the transport request includes information on the size and the shape of the structure, wherein processing circuitry is further configured to
  determine the number of lifting locations based on the size and the shape of the structure; and
  determine the number of robots is based on the number of lifting locations.

18. The robot of claim 15, wherein
  the receiver is configured to receive an overload message from another robot, the overload message indicating that the other robot detects a load exceeding a load limit, and
  the processing circuitry is further configured to, in response to a reception of the overload message:
    instruct the number of robots to abort the lift operation and perform a lower operation, wherein during the lower operation the robots disengage with the assigned lifting location;
    assign an additional robot to the number of robots;
    instruct the additional robot to move to a current location in which the structure is located; and
    assign the additional robot to a lifting location associated with the structure.

19. The robot of claim 15, wherein
  the receiver is configured to receive an unbalanced message from another robot, the unbalanced message indicating that the other robot detects a load exceeding a balanced load limit, and
  the processing circuitry is further configured to, in response to a reception of the unbalanced message:
    instruct the number of robots to abort the lift operation and perform a lower operation, wherein during the lower operation the robots engage with the assigned lifting location; and
    assign at least one robot of the number of robots to a new lifting location associated with the structure.

20. An inventory structure, comprising a number of lifting locations, one of the lifting locations being configured to be engaged with by the robot of claim 12.

21. The control system according to claim 1, wherein the processing circuitry is further configured to determine the number of robots based on a minimum number of robots to lift the structure, needed for transportation of the structure, so that during the transportation to the target location, a center of gravity of the structure is within a threshold distance from a center of the structure.

22. The control system according to claim 1, wherein the receiver is configured to receive the transport request, which includes information indicating a priority of the transport request, the information including an identification number, and wherein the processing circuitry is further configured to assign the number of robots to the transport request based on the identification number.

23. A method, comprising:
receiving a transport request indicating a structure, of a plurality of structures, to be transported to a target location, the structures being of different sizes and shapes, the structures being configured to hold a plurality of items for transport;
determining, based on the transport request, a number of robots to assign to the transport request, the robots being connected in a wireless network;
coordinating a lift operation, by the number of robots, of the structure, wherein during the lift operation a robot engages with a lifting location associated with the structure, the structure having at least one lifting location, a number and positions of lifting locations of the structure depending on a size and a shape of the structure; and
coordinating transport, by the number of robots, of the structure to the target location.

\* \* \* \* \*